US012675577B2

(12) United States Patent
Kalou et al.

(10) Patent No.: US 12,675,577 B2
(45) Date of Patent: Jul. 7, 2026

(54) SYSTEMS AND METHODS FOR INTRODUCING DATA QUALITY AWARENESS IN SECURITY ANALYTICS SOLUTIONS

(71) Applicant: Citrix Systems, Inc., Fort Lauderdale, FL (US)

(72) Inventors: Aikaterini Kalou, Kastritsi (GR); George Panitsas, Kastritsi (GR); Nikos Raptis, Kastritsi (GR); Nikolaos Anastasopoulos, Patras (GR); Orestis Nikolas, Patras (GR); Saifulla Shaik, Cupertino, CA (US)

( * ) Notice: Subject to any disclaimer, the term of this patent is extended or adjusted under 35 U.S.C. 154(b) by 253 days.

(21) Appl. No.: 17/967,384

(22) Filed: Oct. 17, 2022

(65) Prior Publication Data

US 2024/0126888 A1     Apr. 18, 2024

Related U.S. Application Data

(63) Continuation of application No. PCT/GR2022/000053, filed on Sep. 29, 2022.

(51) Int. Cl.
*G06F 21/57*          (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 10,979,525 | B1 * | 4/2021 | Kroeger | H04L 67/566 |
| 12,401,669 | B1 * | 8/2025 | Varakantam | G06F 21/57 |
| 12,405,849 | B1 * | 9/2025 | Reed | G06F 21/604 |
| 12,407,701 | B1 * | 9/2025 | Varakantam | H04L 67/306 |
| 12,407,702 | B1 * | 9/2025 | de Wet | H04L 63/1433 |
| 12,418,552 | B1 * | 9/2025 | Karaje | H04L 43/045 |
| 12,418,555 | B1 * | 9/2025 | Skarphedinsson | G06F 9/45533 |
| 12,425,428 | B1 * | 9/2025 | Sobrier | G06F 21/552 |
| 12,425,430 | B1 * | 9/2025 | Reed | G06F 16/9537 |
| 12,437,192 | B1 * | 10/2025 | Neagu | G06F 9/542 |
| 12,445,474 | B1 * | 10/2025 | Reed | H04L 67/535 |
| 12,452,272 | B1 * | 10/2025 | Subramanian | H04L 43/06 |
| 2016/0364434 | A1 * | 12/2016 | Spitz | G06F 16/248 |
| 2022/0148001 | A1 * | 5/2022 | Rafferty | G06Q 10/0635 |
| 2023/0057632 | A1 * | 2/2023 | Cohen | H04L 63/20 |

(Continued)

*Primary Examiner* — Stephen T Gundry

(57) ABSTRACT

Data quality awareness in security analytics solutions is provided. A system can include one or more processors, coupled to memory. The system can receive a data set comprising one or more events generated for interactions between a plurality of computing devices that execute applications over a network. The system can select a field in the one or more events of the data set that impacts an action performed with the data set based on a model trained via machine learning with a historical data set of events generated for interactions between computing devices. The system can determine a data quality score based on values of the field in the one or more events of the data set. The system can provide an indication of performance of the action with the data set based on a comparison of the data quality score with a threshold.

17 Claims, 9 Drawing Sheets

(56) References Cited

U.S. PATENT DOCUMENTS

| | | | |
|---|---|---|---|
| 2023/0096118 A1* | 3/2023 | Ramsl ..................... | G06F 40/30 |
| | | | 707/736 |
| 2023/0351026 A1* | 11/2023 | Cross ...................... | G06F 9/451 |
| 2025/0103966 A1* | 3/2025 | Beauchesne ........... | G06N 20/00 |
| 2025/0274458 A1* | 8/2025 | Rosomakho .......... | H04L 63/104 |
| 2025/0307948 A1* | 10/2025 | Thompson ............ | G06F 21/554 |
| 2025/0323928 A1* | 10/2025 | Crabtree ............. | H04L 63/1433 |
| 2025/0328448 A1* | 10/2025 | Wang ............... | G06F 16/24552 |

* cited by examiner

SYSTEMS AND METHODS FOR INTRODUCING DATA QUALITY AWARENESS IN SECURITY ANALYTICS SOLUTIONS

CROSS-REFERENCE TO RELATED APPLICATION

This application is a continuation of and claims priority to International Application No. PCT/GR2022/000053, titled "SYSTEMS AND METHODS FOR INTRODUCING DATA QUALITY AWARENESS IN SECURITY ANALYTICS SOLUTIONS" and filed on Sep. 29, 2022, the contents of all of which are hereby incorporated herein by reference in its entirety for all purposes.

FIELD OF THE DISCLOSURE

The present application generally relates to monitoring data quality, including but not limited to systems and methods for introducing data quality awareness in security analytics solutions.

BACKGROUND

Client computing devices and servers can communicate over a network to access an application hosted on a server during a computing session. The server, or a device intermediary to the server and the client device, can monitor events associated with the computing session. However, due to the increasing number of computing session managed via an intermediary device or by the server, and the increasing number of sources that provide information about events, it can be challenging to efficiently evaluate the information about the events in order to accurately and timely identify security risks or other performance issues.

SUMMARY

This technical solution is generally directed to detecting security risks in a networked computing environment by evaluating or assessing the quality of data used to detect security risks. For example, this technical solution can identify a pattern of usage or interaction with applications, files, devices and networks from end-user perspective with an aid of advanced analytics techniques (e.g., machine learning (ML) or artificial intelligence (AI)). The technical solution can support information technology (IT) or security operations (SecOps) teams to detect any risky behavior with minimal effort and provide a policy framework to apply any remediation or triage process.

An analytics system for security may include the following two capabilities: risk detection engine, and self-service search. The risk detection engine can detect suspicious activity based on ingested events and derive appropriate alerts for further actions. The self-service search may allow an end-user to explore deeper events and their corresponding attributes received from various data sources.

As solutions may rely heavily on data-driven threat decisions, it can be vital to ensure the completeness, an accuracy and a standardization of data being consumed by all features. The end-user may be aware of a quality of data at any time that the end-user defines or modifies. With a prevalence of data poisoning attacks, this technical solution can provide data quality insights within a context of security solutions to improve the reliability and efficiency of making data-driven threat decisions.

This technical solution can facilitate onboarding new data sources that have different types of data. New data sources may include events and corresponding attributes with certain characteristics (e.g., loose schema, or semi-structured), making it challenging to identify the most meaningful attributes per event that should be used.

Thus, this technical solution can automatically identify attributes for a data source, determine the key indicators for data quality measurement, and provide data insights about the potential degradation of the solution efficiency. The systems and methods of this technical solution can address the problems by introducing data quality awareness in security analytics solutions.

An aspect of this disclosure can be directed to a system. The system can include one or more processors, coupled to memory. The one or more processors can receive a data set comprising one or more events generated for interactions between a plurality of computing devices that execute applications over a network. The one or more processors can select a field in the one or more events of the data set that impacts an action performed with the data set based on a model trained via machine learning with a historical data set of events generated for interactions between computing devices. The one or more processors can determine a data quality score based on values of the field in the one or more events of the data set. The one or more processors can provide an indication of performance of the action with the data set based on a comparison of the data quality score with a threshold.

In certain embodiments, the action may comprise detection of a security risk for one or more of the plurality of computing devices or applications. The one or more processors can be configured to determine that the data quality score does not satisfy the threshold based on the comparison. The one or more processors can be configured to provide an alert that may indicate that the data processing system is unable to evaluate the security risk with performance above a satisfactory level. The action may comprise a search function configured to execute a query on the data set. The one or more processors can be configured to determine that the data quality score does not satisfy the threshold based on the comparison. The one or more processors can be configured to provide an alert that may indicate that the data processing system is unable to generate search results via the search function with performance above a satisfactory level.

In some embodiments, the one or more events may comprise a plurality of fields. The plurality of fields may comprise at least one of a tenant identifier, client version, product version, type of event, or computing session identifier. The one or more processors can be configured to identify, via the model trained via machine learning, a plurality of fields in the data set. The one or more processors can be configured to select a rule from a rule repository configured to determine the performance of the action with the data set via the data quality score based on the plurality of fields in the data set. The one or more processors can be configured to select the field from the plurality of fields based on the rule configured to use the field to determine the performance of the action.

In some embodiments, the one or more processors can be configured to select the field from a plurality of fields in response to detection of a rule that uses the field to perform the action. The one or more processors can be configured to establish the threshold corresponding to satisfactory performance of the action based on the historical data set. The one or more processors can be configured to receive an indication to onboard a data source that provides the data set. The one or more processors can be configured to detect, via application of a semantic discovery technique to a training data set provided by the data source, a plurality of fields of the training data set. The one or more processors can be configured to generate meta data for the plurality of fields detected via the semantic discovery technique. The one or more processors can be configured to generate profile metrics based on the meta data. The one or more processors can be configured to determine, based at least in part on the meta data and the profile metrics, a level of impact each field of the plurality of fields has on the performance of the action. The one or more processors can be configured to select, based on a ranking of the level of impact of each field of the plurality of fields, the field as having a highest level of impact of the plurality of fields. The one or more processors can be configured to select, from a rule repository, a rule to perform the action corresponding to the field based on the field having the highest level of impact of the plurality of fields. The profile metrics may comprise at least one of a number of rows in the training data set, a number of unique values per field of the plurality of fields, a number of distinct values per field of the plurality of fields, a number of missing values per field of the plurality of fields, or a histogram for each field of fields.

An aspect of this technical solution can be directed to a method for introducing data quality awareness in security analytics solutions. The method can include receiving, by a data processing system comprising one or more processors coupled with memory, a data set comprising a one or more events generated for interactions between a plurality of computing devices that execute applications over a network. The data processing system may select, based on a model trained via machine learning with a historical data set of events generated for interactions between computing devices, a field in the one or more events of the data set that impacts an action performed with the data set. The data processing system may determining that a data quality score based on values of the field in the one or more events of the data set. The data processing system may provide, based on a comparison of the data quality score with a threshold, an indication of performance of the action with the data set.

In some embodiments, the action may comprise detection of a security risk for one or more of the plurality of computing devices or applications. The data processing system may determine that the data quality score does not satisfy the threshold based on the comparison. The data processing system may provide an alert that indicates that the data processing system is unable to evaluate the security risk with performance above a satisfactory level.

In some embodiments, the action may comprise a search function configured to execute a query on the data set. The data processing system may determining, based on the comparison, that the data quality score does not satisfy the threshold. The data processing system may provide an alert that indicates that the data processing system is unable to generate search results via the search function with performance above a satisfactory level. The one or more events may comprise a plurality of fields, the plurality of fields comprising at least one of a tenant identifier, client version, product version, type of event, or computing session identifier.

In some embodiments, the data processing system may identify, via the model trained via machine learning, a plurality of fields in the data set. The data processing system may select, based on the plurality of fields in the data set, a rule from a rule repository configured to determine the performance of the action with the data set via the data quality score. The data processing system may select the field from the plurality of fields based on the rule configured to use the field to determine the performance of the action. The data processing system may select the field from a plurality of fields in response to detection of a rule that uses the field to perform the action. The data processing system may establish, based on the historical data set, the threshold corresponding to satisfactory performance of the action.

In some embodiments, the data processing system may receive an indication to onboard a data source that provides the data set. The data processing system may detect, via application of a semantic discovery technique to a training data set provided by the data source, a plurality of fields of the training data set. The data processing system may generate meta data for the plurality of fields detected via the semantic discovery technique. The data processing system may generate profile metrics based on the meta data. The data processing system may determine, based at least in part on the meta data and the profile metrics, a level of impact each field of the plurality of fields has on the performance of the action. The data processing system may select, based on a ranking of the level of impact of each field of the plurality of fields, the field as having a highest level of impact of the plurality of fields.

In one aspect, the present disclosure is directed to a non-transitory computer readable medium storing program instructions. The non-transitory computer-readable medium can store instructions that, when executed by one or more processors, cause the one or more processors to receive a data set comprising a one or more events generated for interactions between a plurality of computing devices that execute applications over a network. The instructions can include instructions to select, based on a model trained via machine learning with a historical data set of events generated for interactions between computing devices, a field in the one or more events of the data set that impacts an action performed with the data set. The instructions can include instructions to determine a data quality score based on values of the field in the one or more events of the data set. The instructions can include instructions to provide, based on a comparison of the data quality score with a threshold, an indication of performance of the action with the data set. The action may comprise at least one of detection of a security risk for one or more of the plurality of computing devices or applications or a search function configured to execute a query on the data set.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
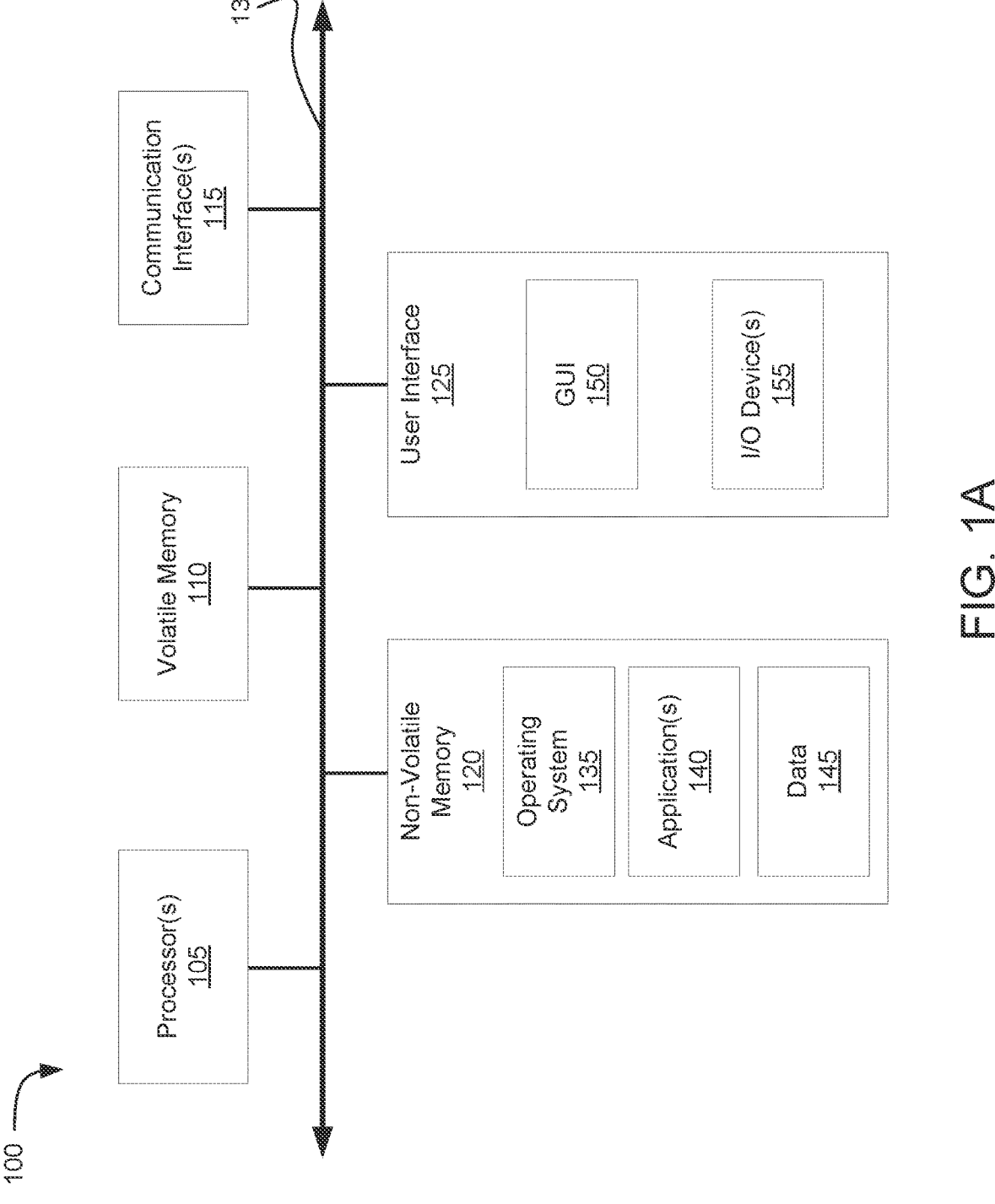
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for introducing data quality awareness in security analytics solutions.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
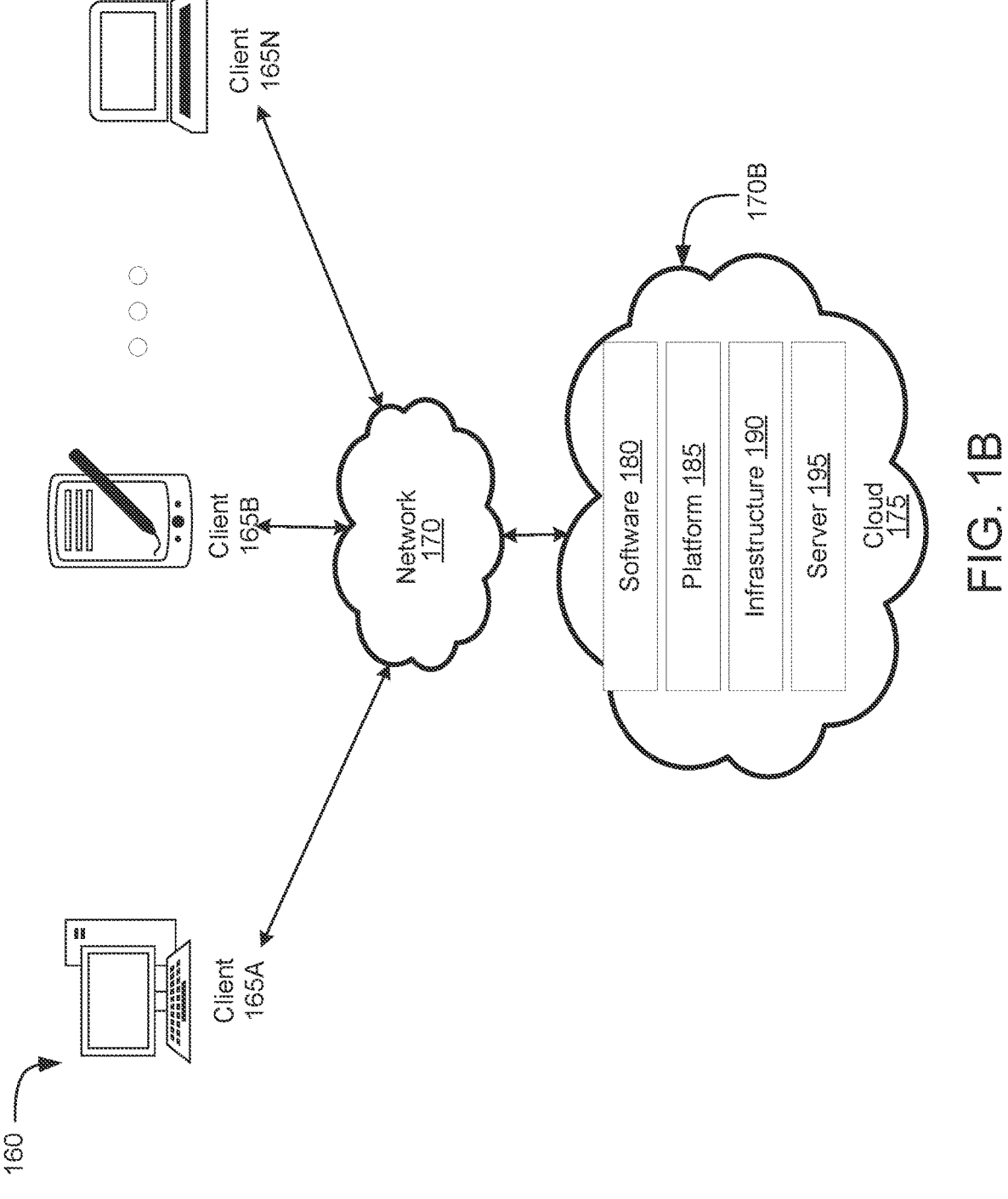
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Introducing Data Quality Awareness in Security Analytics Solutions This disclosure is generally directed to detecting security risks in a networked computing environment by evaluating or assessing the quality of data used to detect security risks. This technical solution can provide an enhanced data quality system that interacts with an analytics service (AS) data infrastructure and an analytics for security (AS/S) system.

For example, a data quality system can include one or more components configured to provide: (i) semantic discovery, (ii) data profiling, (iii) data quality rule discovery and execution, (iv) data quality score, or (v) data quality score change detection. However, when the quality of data used to perform these tasks is insufficient or unknown, it can be challenging to reliably and accurately perform these tasks or processes, thereby negatively impacting the performance with which security risks can be identified. When the data is unstructured, has undefined semantics, or is sparse, it can pose further challenges to ensure the data fitness for accurately, reliably, or efficiently detecting security risks.

Systems and methods of this technical solution can address the aforementioned challenges. For example, this technical solution can evaluate the quality of data by detecting semantics for predetermined or desired attributes, provide contextual data quality insights, or determine the impact or importance of an attribute on detecting a security risk. The detection of semantics for predetermined or desired attributes can be a detection of semantic data types in a context of data sources. The detection of semantics for attributes may leverage deep neural network techniques having high robustness to dirty data and scaling capabilities by simply retraining the corresponding models with a new data corpus being targeted to data specifications. The contextual data quality insights may identify which of data source attributes can be considered as key attributes-dimensions based on initial profiling metadata over a whole data source. The identified dimensions can be then forwarded and used in the data quality processes (e.g., a data profiling, a data quality rule execution or a data quality score) in order to derive targeted data quality insights for any combination of the discovered dimensions. This can facilitate viewing and monitoring data quality insights, such as in an environment with high multitenancy and data variability. The attribute importance recommendation may leverage a machine learning technique in order to determine the most important attributes per event type for a newly on boarded or an existing data source. This method may rely purely on native data characteristics of a data source (e.g., contextual data profiling metrics, or other features). The attribute importance recommendation can provide a sorted list with the most important or relevant attributes that can be considered in a data quality assessment and an actual data usage on analytics solutions.

In some aspects, this technical solution can enhance facilitate the functionality and usability of the AS/S with directly providing contextual data quality insights that can improve the efficiency of delivered features. The end-user (e.g., an administrator) of the AS/S can be continuously aware of any potential data quality issues while he or she interacts with the data. The analytics solution provides in a way any contextual data quality insight by being connected directly with the proposed system (e.g., AS/DQ).

The present disclosure brings a system to enhance directly the analytics for security (or any similar solution) with data quality insights for better efficiency of its features. In doing so, methods for detecting semantics of company-specific attributes, recommending the most important attributes, or deriving contextual data quality insights within a data ecosystem of multitenancy, high data variability, or non-uniform event schema setting.

The present disclosure provides a data quality metric on native features of a security analytics solutions. The present disclosure provides a standardization of company-specific attribute as a semantic data type and as a dimension for improving a data quality rule discovery and a contextualization of the data quality score, correspondingly. The present disclosure provides a recommendation of attribute in terms of importance for multi-event data sources with loose schema and non-well-defined data model.

Figure 2:
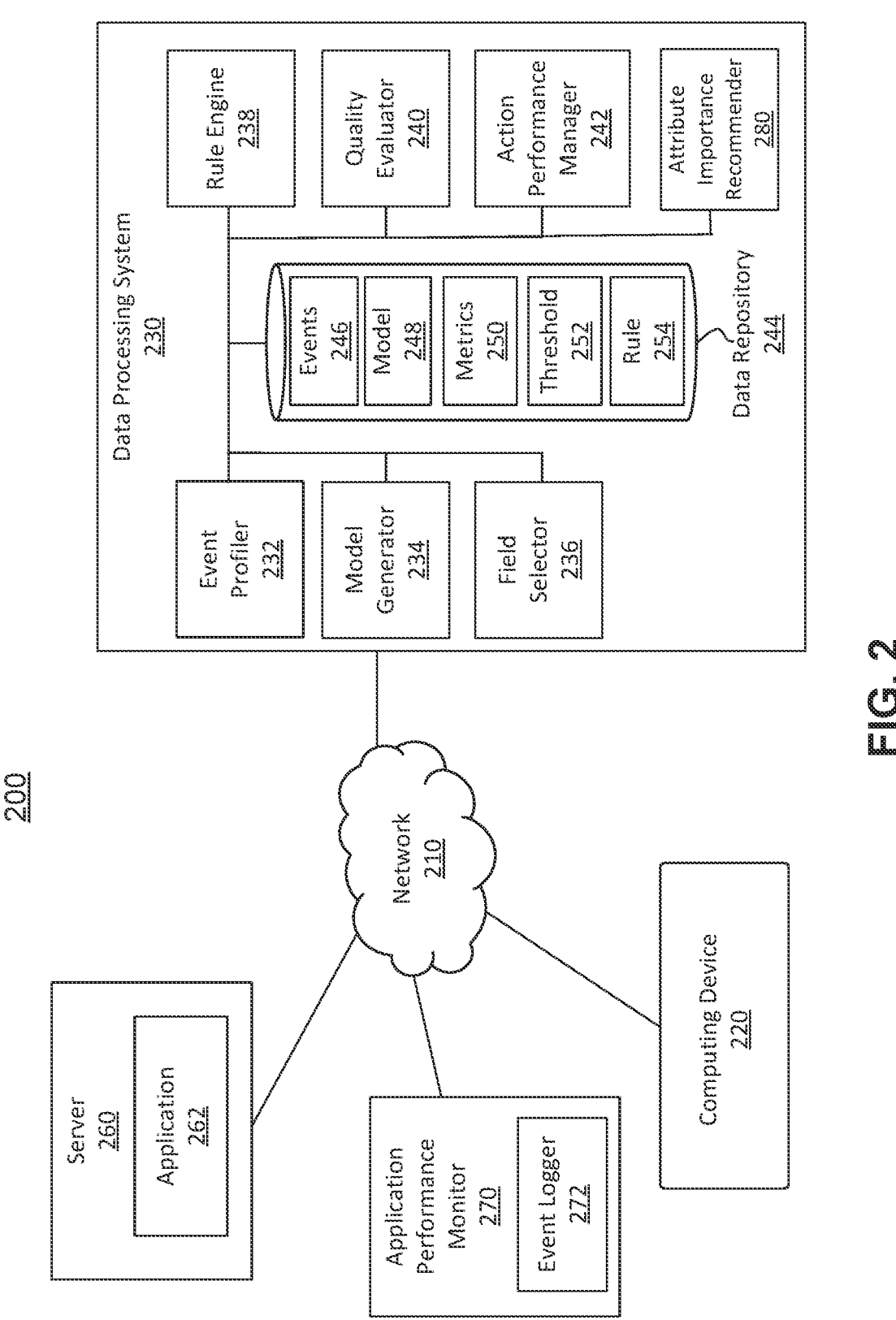
FIG. 2 is an example block diagram for introducing data quality awareness in security analytics solutions, in accordance with one or more implementations.

Referring to FIG. 2, depicted is a block diagram of an example system 200 for introducing data quality awareness in security analytics solutions. The system 200 can include an interface with or otherwise communication with at least one computing device 220, at least one data processing system 230, at least one server 260, or at least one application performance monitor 270 via a network 210. The system 200 or its components (e.g., network 210, computing device 220, data processing system 230, server 260, or application performance monitor 270) can include or be composed of hardware, software, or a combination of hardware and software components. The one or more components (e.g., computing device 220, data processing system 230, server 260, or application performance monitor 270) of the system 200 can establish communication channels or transfer data via the network 210. For example, the server 260 can communicate with at least one of the data processing system 230 or the computing device 220 via the network 210. In another example, the data processing system 230 can communicate with other devices, such as the server 260 or the computing device 220 via the network 210. The communication channel between various different network devices can communicate with each other via the network 210 or different networks 210.

The network 210 can include computer networks such as the Internet, local, wide, metro or other area networks, intranets, satellite networks, other computer networks such as voice or data mobile phone communication networks, and combinations thereof. The network 210 may be any form of computer network that can relay information between the one or more components of the system 200. The network 210 can relay information between server(s) 260 and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., computing device 220, data processing system 230, server 260, or application performance monitor 270) may communicate wirelessly (e.g., via WiFi, cellular, radio, etc.) with a transceiver that is hardwired (e.g., via a fiber optic cable, a CAT5 cable, etc.) to other computing devices in the network. Any or all of the computing devices described herein (e.g., computing device 220, data processing system 230, server 260, or application performance monitor 270) may also communicate wirelessly with the computing devices of the network via a proxy device (e.g., a router, network switch, or gateway). In some implementations, the network 210 can be similar to or can include the network 170 or a computer network accessible to the computer 100 described herein above in conjunction with FIG. 1A or 1B.

The system 200 can include or interface with at least one server 260. The server 260 may be referred to as a host system, a cloud device, a remote device, a remote entity, or a physical machine. The server 260 can include or correspond to as a node, remote devices, remote entities, application servers, or backend server endpoints. The server 260 can be composed of hardware or software components, or a combination of both hardware or software components. The server 260 can include resources for executing one or more applications, such as SaaS applications, network applications, or other applications within a list of available resources maintained by the server 260. The server 260 can include one or more features or functionalities of at least resource management services (e.g., resource management services) or other components within the cloud computing environment (e.g., cloud computing environment). The server 260 can communicate with the computing device 220 via a communication channel established by the network 210, for example.

The at least one server 260 may include one or more applications 262. The one or more applications 262 and associated components may provide a user with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

The server 260 can host one or more virtual machines. For example, the server 260 can be a physical machine hosting various virtual machines. The server 260 can allocate or share resources (e.g., CPU or memory resources) to the virtual machines, which may or may not be evenly distributed. The server 260 can include features or functionalities similar to a cloud computing environment to provide resources for applications or services for access by a computing device. Individual machines (e.g., virtual machines) hosted by the server 260 can be associated with a session. The server 260 can host the one or more virtual machines to establish a session with individual computing device when receiving a request for session establishment. The server 260 can provide the computing device with resources via the established session. In some cases, the server 260 can include or maintain a log of historical hardware performance of the virtual machines, such as CPU utilization, RAM utilization, network bandwidth, read or write speed, etc. In some cases, the server 260 can include or maintain a log of historical activity data of the user, such as input data (e.g., keyboard input or mouse input), resource(s) accessed (e.g., executing, initiating, or terminating applications), login time, log off time, inactivity timer (e.g., a count or countdown of last activity recorded), among other indications of activity from the user. The server 260 may be managed by an administrator (e.g., an administrative entity). The server 260 may provide logged data, such as the historical hardware performance data or historical activity data to other entities or devices, such as the data processing system 130. In some cases, the server 260 can include one or more features, functionalities, or components similar to, or perform one or more operations of the data processing system 230. The server 260 may be remote from the data processing system 230. In some cases, the server 260 can include the data processing system 230 as part of the server 260.

The system 200 can include or interface with at least one computing device 220. The computing device 220 can include at least one processor and a memory, e.g., a processing circuit. The computing device 220 can include various hardware or software components, or a combination of both hardware and software components. The computing device 220 can be constructed with hardware or software components and can include features and functionalities similar to the client devices 165 described hereinabove in conjunction with FIGS. 1A-B. For example, the computing device 220 can include, but is not limited to, a cluster node, a television device, a mobile device, smart phone, personal computer, a laptop, a gaming device, a kiosk, or any other type of computing device.

The at least one computing device 220 may execute at least one application over the network 210. During execution of the at least one application, the at least one computing device may generate one or more events for interactions between the at least one computing device. The one or more events can be generated or triggered by a system, by a user, or in other ways. The one or more events may comprise an action or occurrence that can be identified by a program and has significance for system hardware or software. The one or more events can be user-generated, such as keystrokes and mouse clicks, or system-generated, such as program loading, running out of memory and errors.

The system 200 can include at least one data processing system 230. The data processing system 230 can include various components to introduce data quality awareness.

The data processing system 230 can include at least one event profiler 232. The data processing system 230 can include at least one model generator 234. The data processing system 230 can include at least one field selector 236. The data processing system 230 can include at least one rule engine 238. The data processing system 230 can include at least one quality evaluator 240. The data processing system 230 can include at least one action performance manager 242. The data processing system 230 can include at least one data repository 244. Individual components (e.g., event profiler 232, model generator 234, field selector 236, rule engine 238, quality evaluator 240, action performance manager 242, or data repository 244) of the data processing system 230 can be composed of hardware, software, or a combination of hardware and software components. Individual components of the data processing system 230 can be in electrical communication with each other. For instance, the event profiler 232 can exchange data or communicate with the model generator 234, field selector 236, rule engine 238, quality evaluator 240, action performance manager 242, or data repository 244. The one or more components of the data processing system 230 can be used to perform features or functionalities, such as receiving a data set, selecting a field in an event of the data set, determining a data quality score, or providing an indication based on the data quality score. The data processing system 230 can operate remotely from the server 260, the computing device 220, an application performance monitor 270, or other devices in the system 200.

In some cases, the data processing system 230 can be a part of the server 260, the computing device 220, or application performance monitor 270, such as an integrated device, embedded device, a server-operated device, or a device accessible by the administrator of the server 260. For example, the data processing system 230 can perform operations local or on-premise to the computing device 220 or the server 260. One or more components (e.g., event profiler 232, model generator 234, field selector 236, rule engine 238, quality evaluator 240, action performance manager 242, data repository 244, or attribute importance recommender 280) of the data processing system 230 can be executed on the server 260 or the computing device 220. The data processing system 230 can be a part of or correspond to a virtual machine of the server 260 executing an application for the computing device 220. For example, the operations of the data processing system 230 can be performed by the virtual machine assigned to the respective computing device 220. In some cases, one or more components or functions of the data processing system 230 can be packaged into a script, agent, or bot configured to execute on the server 260, computing device 220, or application performance monitor 270.

The event profiler 232 may receive a data set. The data set may comprise one or more events generated for interactions between one or more computing devices that execute applications over the network 210. The data can be semi-structured with field semantics not directly depicted in a data schema. The one or more events may comprise one or more fields. The one or more fields may comprise at least one of a tenant identifier, client version, product version, type of event, or computing session identifier.

The event profiler 232 may identify which of data source attributes can be considered as key attributes-dimensions in the received data set. Sample rows can be examined and field semantics can be identified, including advanced semantics (e.g., an event type, a product or client version, a tenant identifier, or a computing session identifier). The event profiler 232 may receive an indication to onboard a data source that provides the data set. For example, the event profiler 232 may onboard a new data source for a semantic discovery.

The event profiler 232 may process the data set, and may generate metrics and metadata for a new data source, sliced by key dimensions like a "event type". The slices (e.g., key dimensions) defined based on key fields identified can be an event type or a product version. The metadata may refer to individual dataset attributes as well as set of attributes (e.g., key statistics, or histograms).

The model generator 234 may train a machine learning model with a training data set. The training data set can be a historical data set of events generated for interactions between computing devices. The model generator 234 may extract the one or more features (e.g., a tenant identifier, client version, product version, type of event, or computing session identifier) from the training data set to train the machine learning model with a semantic discovery. There can be several definitions/features to train the machine learning model.

The model generator 234 may detect one or more fields of a training data set via application of a semantic discovery technique to a training data set provided by the data source. The semantic discovery service may pass data samples, calculate metadata, and respond with an identified semantic (e.g., a date, a user identifier, a tenant identifier, an event type, a product or client version). The service can be trained to identify advanced specific semantics inside the semi-structured data. This information can be captured in the dataset metadata and persisted at storage.

The model generator 234 may generate meta data for the one or more fields detected via the semantic discovery technique. The meta data may provide information about one or more aspect of the data. The meta data may be used to summarize basic information about the data. The information of metadata may comprise a data type, a length, discrete values, a uniqueness of values, an occurrence of null values, typical string patterns, or an abstract type recognition. For example, the meta data can be descriptive metadata, structural metadata, or administrative metadata. The model generator 234 may generate profile metrics based on the meta data. The profile metrics may comprise at least one of a number of rows in the training data set, a number of unique values per field of the plurality of fields, a number of distinct values per field of the plurality of fields, a number of missing values per field of the plurality of fields, or a histogram for each field of the plurality of fields.

The field selector 236 may select a field in the one or more events of the data set that impacts an action performed with the data set based on the trained model. The field may comprise a date, a user identifier, a tenant identifier, an event type, a product version, or a client version. The action may comprise detection of a security risk for one or more computing devices or applications. The detection of the security risk may detect suspicious activity based on the events. The detection of the security risk may comprise two sub-components: a custom risk indicator and a default risk indicator. The custom risk indicator can be created, modified or deleted manually by the administrators, but there are also some pre-configured risk indicators. Among other key information, a query may indicate entities or attributes, their corresponding conditions (attributes) and origin data source being defined.

In some embodiments, the action may comprise a search function configured to execute a query on the data set. The search function can be a self-service search. The self-service search may enable an end-user to explore deeper the events and their corresponding attributes, received from various data sources. It can help the end-user to define search queries, apply various filters matching his criteria and understand more thoroughly the events and potentially to define his own custom indicators. On top of that, it can be used as a way to view the events after a trigger and alert from a custom indicator.

The field selector 236 may identify one or more fields in the data set via the model trained via machine learning. The machine learning model may determine some important fields in the data set for a newly on boarded or an existing data source. The machine learning model may generate a ranking of the level of impact of each field of the one or more fields. The field selector 236 may select the field as having a highest level of impact of the one or more fields based on the ranking of the level of impact of each field of the one or more fields.

The field selector 236 may select the field from the one or more fields in response to detection of a rule that uses the field to perform the action. The field selector 236 may select the field from the one or more fields based on the rule configured to use the field to determine the performance of the action. For example, the field selector 236 may be notified a first rule is selected by the rule engine 238. The field selector 236 may select a field from the one or more fields to perform an action according to the first rule.

The rule engine 238 may select a rule from a rule repository configured to determine the performance of the action with the data set via the data quality score based on the one or more fields in the data set. The set of rules across data quality dimensions may comprise completeness, uniqueness, or validity. For example, the rule may comprise a country field. The country field may not be empty. The country field may comprise values within a predefined list (of valid countries). Different countries may have different rules. The rule engine 238 may store a discovered rule to a rule repository 254. A user may review the rule and may make any adjustments or additions.

The rule engine 238 may determine a threshold for a data quality score. The threshold can be any number, value, score set by an administrator or operator. For example, the threshold can be 90, 80, 70, 60 or other value. In some cases, the threshold can be a percentage or ranking. The rule engine 238 may establish the threshold corresponding to satisfactory performance of the action based on the historical data set. The rule engine 238 may analyze one or more historical data of an event performance, and may determine a threshold for the event performance. The threshold can be used for a risk detection. For example, the rule engine may determine that a threshold score for the event of program loading can be 70 based on historical data of program loading. Next, the quality evaluator 240 may determine that the event with the score of 80 satisfies the threshold of 70. The threshold can be defined based on rule recommendations. The rules may be evaluated periodically. Some rules may "pass," and others may "fail". The rule evaluation results can be aggregated to provide a data quality score. If each rule output is either 0 or 1 and a data quality score is an average across multiple rules, the average can be a number between 0 and 1, which can be the data quality score. The data quality score can be monitored. When the data quality score drops below a threshold, a type of alert can be generated to notify an administrator through specific insights via a product user interface.

The rule engine 238 may select a rule to perform the action corresponding to the field based on the field having the highest level of impact of the one or more fields. For example, if a first field is level 1 of impact of the one or more fields and a second field is level 3 of impact of the one or more more fields, the rule engine 238 may select a rule corresponding to the second field to perform the action since the level 3 (second field) is higher than the level 1 (first field).

The quality evaluator 240 may determine a data quality score based on values of the field in the one or more events of the data set. The quality evaluator 240 may consume the data profiling metadata and leverage the field semantics. The quality evaluator 240 may input the data profiling and the semantic discovery from other engines and may output the data quality score based on the information of the data profiling and the semantic discovery. For example, the quality evaluator 240 may output a score of 0.3 for an event of program loading. The quality evaluator 240 may determine that the data quality score does not satisfy the threshold based on the comparison. For example, the threshold score for an rule set evaluated over a dataset (or a subset of the rules referring to one of the quality dimensions (e.g., completeness) may be 0.7. The quality evaluator 240 may determine that the event with the score of 0.3 does not satisfy the threshold of 0.7.

A data quality rule may represent one of data quality dimensions, such as completeness, validity, or uniqueness. The data quality rule can be related to an attribute of a dataset or to more than one. The evaluation of a data quality rule can be performed over each row (event) of a dataset. There can be multiple data quality rules that can be evaluated over a row (event) of a dataset. The evaluation of data quality rules result in a binary outcome, 0 or 1, reflecting a failure and a success correspondingly.

For example, the quality evaluator 240 may evaluates data quality rules over the above dataset. After the evaluation of the data quality rules over the above dataset. Outcomes (e.g., 0 or 1) may be distributed across the attributes of each row/event of the dataset. An attribute can have more than one data quality rule. Each cell may contain more than one result. In table 2, each dimension (e.g., x, y, or x in (x, y, z) for each cell) may represent the data quality rules for the different data quality dimensions. In table 1, a dataset (input data) may have M rows (number of events) and N attributes.

TABLE 1

|  | Attribute 1 | Attribute 2 | Attribute 3 | . . . | Attribute N |
|---|---|---|---|---|---|
| Event 1 | Value11 | Value12 | Value13 | . . . | Value 1N |
| Event 2 | Value21 | Value22 | Value23 | . . . | Value2N |
| . . . | . . . | . . . | . . . | . . . | . . . |
| Event M | ValueM1 | ValueM2 | ValueM3 | . . . | ValueMN |

Thereafter, the quality evaluator 240 may summarize and aggregate the outcomes of the set of data quality rule for each one of the cell, by using the "product" of the values of each cell. The quality evaluator 240 may aggregate of scores, such as over an entire rule set evaluated over the entire dataset, or a subset of the rules referring to one of the quality dimensions (e.g., completeness).

TABLE 2

|  | Attribute 1 | Attribute 2 | Attribute 3 | . . . | Attribute N |
|---|---|---|---|---|---|
| Event 1 | (1, 1, 1) | (0, 0, 1) | (0, 0, 1) | (1, 0, 1) | (1, 1, 1) |
| Event 2 | (1, 0, 0) | (0, 0, 0) | (0, 0, 0) | (0, 0, 0) | (0, 0, 0) |
| . . . | (0, 0, 0) | (0, 0, 0) | (1, 0, 0) | (0, 0, 0) | (1, 1, 0) |
| Event M | (1, 0, 0) | (0, 0, 0) | (1, 0, 0) | (0, 0, 0) | (0, 0, 0) |

Finally, the quality evaluator 240 may calculate an average of the products from previous ACT for each one of the attributes (marked at the bottom of table 3). The quality evaluator 240 may calculate an average of the products from previous step for each one of the rows/events of the dataset (marked at the right of table 3). The quality evaluator 240 may calculate a overall average of all products (overall data quality score, marked at bottom right corner of table 3).

engine 238, which may limit the list of rules to the most important attributes. In some aspect, the attribute importance recommender 280 may consume product features, as attribute importance insights.

TABLE 3

| | Attribute 1 | Attribute 2 | Attribute 3 | . . . | Attribute N | |
|---|---|---|---|---|---|---|
| Event 1 | $\Pi_{11}(1,1,1) = 1$ | . . . | . . . | . . . | . . . | Event 1 Data Quality Score $\frac{1}{N}\sum_{j=1}^{N}\Pi_{1j}$ |
| Event 2 | . . . | . . . | . . . | . . . | . . . | . . . |
| . . . | . . . | . . . | . . . | . . . | . . . | |
| Event M | $\Pi_{M1}(1,0,1) = 0$ | . . . | . . . | . . . | . . . | Event M Data Quality Score $\frac{1}{N}\sum_{j=1}^{N}\Pi_{Mj}$ |
| | Attribute 1 Data Quality Score $\frac{1}{M}\sum_{i=1}^{M}\Pi_{i1}$ | Attribute 2 Data Quality Score $\frac{1}{M}\sum_{i=1}^{M}\Pi_{i2}$ | | | Attribute N Data Quality Score $\frac{1}{M}\sum_{i=1}^{M}\Pi_{iN}$ | Overall Data Quality Score |

The quality evaluator 240 may determine a level of impact each field of one or more fields has on the performance of the action based at least in part on the meta data and the profile metrics. By determining the level of impact, the quality evaluator 240 may alleviate the impact of a relaxed requirement of highly curated data. For example, the quality evaluator 240 may rank a first field for detection of a security risk at a lower level (e.g., level 1), and a second field for detection of a security risk at a higher level (e.g., level 3). As another example, if a client device's location is not correctly indicated, a field with countries attribute (code) may become important to evaluate a security risk.

The attribute importance recommender 280 may determine an attribute importance of the meta data according to a data profiling and semantic discovery output. The attribute importance recommender 280 may provide a list of important attributes. An attribute can be determined to be important based on the impact the attribute has on detecting a security risk. For example, some attributes may have a greater impact on detecting a security risk as compared to other attributes. The attribute importance recommender 280 can leverage the model 248 generated to evaluate or determine the importance of an attribute. In certain embodiments, the attribute importance recommender 280 can be trained by the model generated 234 to evaluate or determine the importance of an attribute. Factors for specifying attribute importance can include, for example, various variables or features from the meta data, such as: TotalRowNum, TotalMissingValuesNum, AttributeCompleteness ($\cong$1–TotalMissingValuesNum/TotalRowNum), or AttributeEventPresence ($\cong$1–AttributeEventUniqueness). The above list of features can be exemplary and can be optionally extended to a larger set of features. The attribute importance recommender can forward the list of important attributes to the rule The quality evaluator 240 may query a rule repository 254 for sets of rules that apply to a selected field. The quality evaluator 240 may recommend a set of rules for the selected field. The set of rules across data quality dimensions may comprise completeness, uniqueness, or validity. For example, the rule may comprise a country field. The country field may not be empty. The country field may comprise values within a predefined list (of valid countries). Different countries may have different rules.

The action performance manager 242 may provide an indication of performance of the action with the data set based on a comparison of the data quality score with a threshold. The action performance manager 242 may provide an alert to a user based on the comparison. For example, the alert may indicate that the data processing system is unable to evaluate the security risk with performance above a satisfactory level. In some cases, the alert may indicate that the data processing system is unable to generate search results via the search function with performance above a satisfactory level. The indication of performance can include a confidence score associated with the performance of the action. For example, if the action is detecting a security risk, then the confidence score can indicate the confidence with which a security risk was determined, such as 90%, 100%, or 80%. The indication of performance can indicate an efficiency or efficacy of the action. The indication of performance can include a binary indication, such as satisfactorily performed, or unsatisfactory. In some cases, the indication of performance can include an indication that the action was not able to be performed or that the action cannot be performed due to the quality of data being less than a threshold.

The data processing system 230 can provide an alert with the indication of the performance. The data processing system 230 can provide the alert via network to a computing device 220 or other device associated with an administrator or operator of the data processing system 230, application performance monitor 270, application 262, or server 260. The data processing system 230 can provide a notification or electronic message comprising the alert. In some cases, the data processing system 230 can automatically terminate an action or process associated with the application 262 that may have given rise to the security risk for which the performance is below a threshold.

The data repository 244 may be referred to as a data repository, central storage, or memory of the data processing system 230. The one or more storages (e.g., events storage 246, model storage 248, metrics storage 250, threshold storage 252, or rule storage 254) can be accessed, modified, or interacted with by one or more components (e.g., event profiler 232, model generator 234, field selector 236, rule engine 238, quality evaluator 240, action performance manager 242, or data repository 244) of the data processing system 230. In some cases, the one or more storages of the data repository 244 can be accessed by one or more other authorized devices of the system 200, such as the server 260. The data repository 244 can include other storages to store additional data from one or more components of the data processing system 230 or data from other devices of the system 200, for example.

The events storage 246 may comprise one or more events generated for interactions between a plurality of computing devices that execute applications over a network. The event 246 data structure can include, for example: {type, data source identifier, attribute}. The attribute field within the event 246 data structure can include a data structure, such as: {attribute type, value}. The model storage 248 may comprise a model trained via machine learning with a historical data set of events generated for interactions between computing devices. The metrics storage 250 may comprise a data quality score determined by the quality evaluator 240 and profile metric from meta data. The threshold storage 252 may comprise a threshold determined by the rule engine 238 or any predefined threshold. The rule storage 254 may a rule configured to perform an action.

The system 200 can include at least one application performance monitor 270. The application performance monitor 270 can include various components to introduce data quality awareness. The application performance monitor 270 can include at least one event logger 272. The event logger 272 may keep track of events generated for interactions between one or more computing devices that execute applications over the network 210. The event logger 272 may store the one or more events. The event logger 272 may send the recorded events to the data processing system periodically (e.g., daily). In some embodiments, the event logger may record any event or interaction in an analytics for security (AS/S) system.

Figure 3:
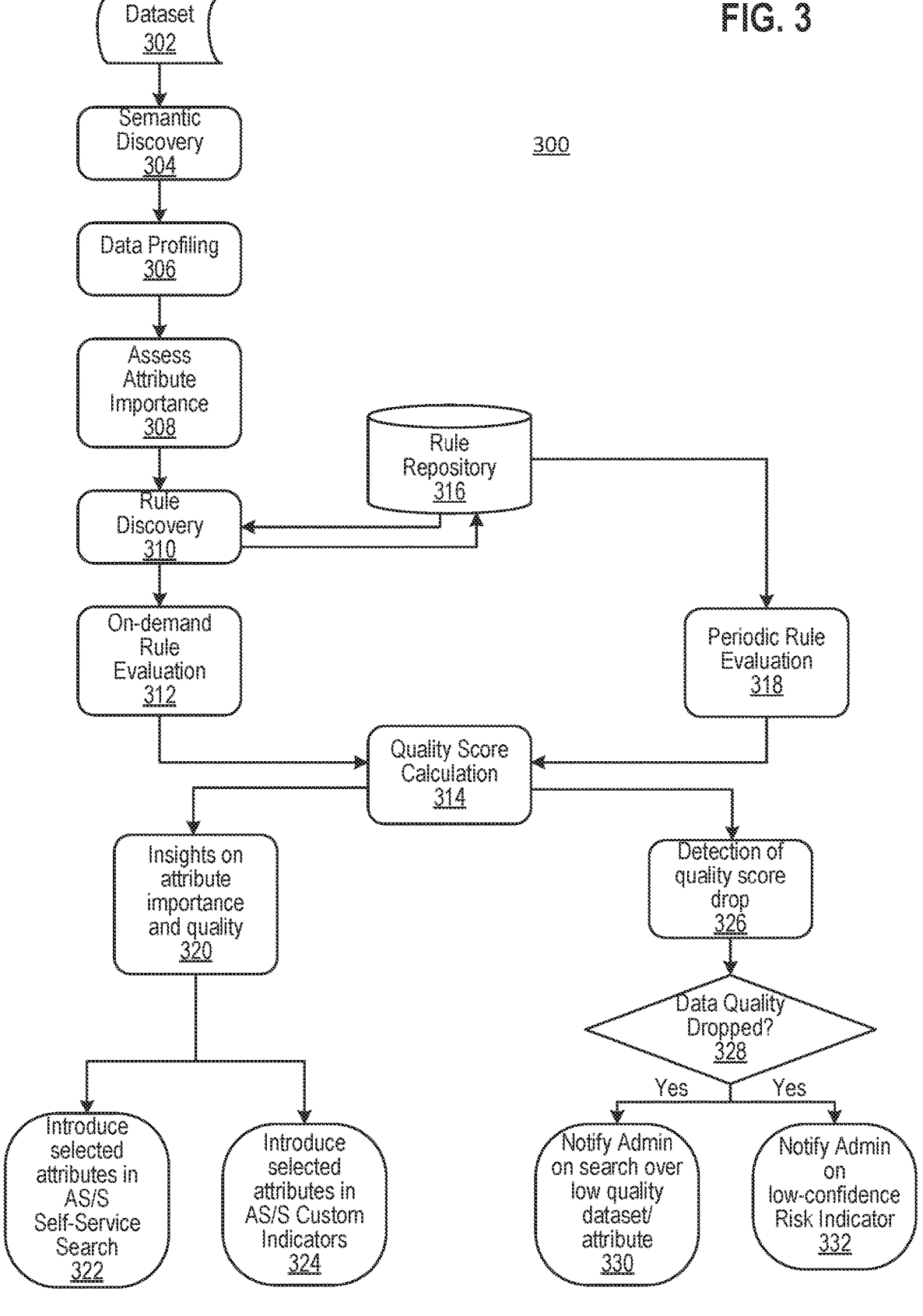
FIG. 3 is an example flow diagram for introducing data quality awareness in security analytics solutions, in accordance with one or more implementations.

FIG. 3 is an example flow diagram of a method 300 for introducing data quality awareness in security analytics solutions, in accordance with one or more implementations. The method 300 can be performed by one or more system or component depicted in FIG. 1A, 1B, or 2, including, for example, a data processing system.

At ACT 302, the data processing system can receive a new dataset. The data processing system can receive the new data set from a data source provider via a network. The data processing system can begin an onboarding process for the new dataset responsive to receiving the data set, or responsive to an indication or instruction to begin the onboarding process. The dataset may be new because the data set is different from the dataset or types of datasets with which the data processing system was previously working. The data processing system can receive an indication that the data set is a new data set, or determine the data set is new based on an identifier of the data set or an identifier of the source of the data set.

At ACT 304, the data processing system can perform or apply a semantic discovery on the new data set. The semantic discovery can be an approach to profiling data based on its semantic categories. The data processing system may examine sample rows of the new data set. The data processing system may identify field semantics in the new data set, including advanced semantics. The advanced semantics may include an event type, a product version, a client version, a tenant identifier, or a session identifier. The data processing system can determine semantic relationships in the new data set.

At ACT 306, the data processing system can apply a data profiling on the new data set. The data processing system can determine slices (key dimensions) defined based on key fields identified in the previous ACT. The key dimensions can be the event type or the product version for instance. The data processing system can generate a field metric and metadata of the new data set. Information of the metadata may comprise a data type, a length, discrete values, a uniqueness, an occurrence of null values, typical string patterns, or an abstract type recognition.

At ACT 308, the data processing system can use the discovered semantics and the data profiling metadata to assess an attribute importance of the data set. The data processing system can provide an attribute recommendation according to the attribute importance. An attribute recommendation can be used for concentrating a focus of following data quality pipeline on the most important attributes. The attribute can be used by product managers and developers for selecting the most important attributes for inclusion in product features (e.g., a self-service search (SSS) 322 or a custom indicator 324). The product features can be used as insights provided to a customer while using the features.

At ACT 310, the data processing system can identify relevant rules in a rule repository 316 according to the discovered semantics and the data profiling metadata. The identified relevant rule may be the most important attributes from a rule set hosted in the rule repository 316. The data processing system can identify the relevant rules in the rule repository 316 according to dimensions (e.g., completeness, uniqueness, or validity). The data processing system may update the discovered rules according to the discovered semantics and the data profiling metadata. For example, the discovered rules can be data quality rules, or automatic ways regarding countries. The discovered rules can be stored back in the rule repository 316 with an updated attribute configuration. In some embodiments, the rule repository can be semi-manual.

At ACT 312, the data processing system can evaluate a rule of the discovered rules on demand. The data processing system can apply the rule of the discovered rule on collected records of the data set. The data processing system can provide an evaluation result. The evaluation result can be persisted in a storage. The rule evaluation results can be aggregated in per attribute and overall data quality scores. Engineers and product managers (PMs) may review the rule evaluation results and provide feedback.

At ACT 314, the data processing system can calculate a data quality score. The data processing system can forward the data quality score and the attribute importance recommendations to a customer. The data processing system can transform the data quality score and the attribute importance recommendations into a specific product feature. The specific product feature can be SSS and custom indicators, in a form of insights. For instance, if a client's location is not correctly indicated (e.g., a country field is not correct), this may indicate the country field is of low quality. The country field may not be promoted to be used as part of SSS or custom indicators features.

At ACT 318, in parallel, the data processing system can periodically evaluate the discovered rules to assess the quality of the dataset or ensure an accuracy of the discovered rules. The data processing system can update the discovered rules according to the evaluation result in 312. For example, the data processing system can evaluate the discovered rules with a daily data quality score being calculated by considering the different slices (key dimensions).

At ACT 320, the data processing system can determine an importance according to the calculated data quality score and the data profiling metadata. The data processing system can introduce selected attributed in AS/S self-service search 322 based on the attribute importance. The data processing system can introduce selected attributes in AS/S custom indicators 324 based on the attribute importance.

At ACT 326, the data processing system can monitor the calculated data quality score. In case of data quality score drop 328, the data processing system can send a notification to a customer. At ACT 330, the notification may indicate that an administrator perform a search over a dataset that has reduced overall quality. The notification may indicate that the administrator to perform a search based on an attribute with reduced quality. At ACT 332, the notification may indicate an low confidence risk indicator to an administrator. The notification may ask the administrator to define a new custom indicator based on an attribute with reduced quality. The notification may include a new user risk indicator which was calculated based on attributes with reduced quality. The data processing system may adjust or recommend the attribute based on the data quality score.

A flow for contextual data quality insights starts by applying data profiling over an entire dataset of a data source. A profiling metadata can be derived on daily basis. After deriving enough profiling metadata for an examined data source, the AS/DQ system can select some of its main profiling metrics per attribute. The profiling metrics may include at least one of: a total number of rows, a number of unique values (per attribute), a number of distinct values (per attribute), a number of missing values (per attribute), or histograms (per attribute).

The AS/DQ system may derive a new feature, named AttributeEventUniqueness, for each one of the data source attributes. This feature may represent how rare (or unique) an attribute is across a total set of events of the data source. This new feature can be defined through the following formula:

$$AttributeEventUniqueness = 1 - \frac{\text{\# events with non-zero profiling metrics}}{\text{\# total events for the data source}}$$

The flow continues by selecting only the data source attributes for which feature AttributeEventUniqueness evaluates to 0. A filtering step may end up with a set of attributes that are common across various event types of a data source. For this particular set of attributes, the process continues by monitoring their corresponding "number of distinct values" (hereafter Distinctness). Next follows the detection of any significant changes (spikes—drops or increases) on the daily Distinctness for these attributes (over the profiling time of period). In fact, there can be multiple univariate time-series, each one corresponding to the Distinctness of each attribute, that can be labeled as stationary or not. This step can be easily implemented by using well known methods for time-series change point detection. The attributes with strong stationarity may be the ones that can be considered as the dimensions of the examined data sources. As explained and shown in the overall flowchart in FIG. 3, these dimensions are the slices that can be configured in the data profiling process, and the data quality score calculation. In some embodiments, the definition of the key attributes-dimensions of a data source can be a deterministic process by considering human expertise and domain knowledge. Different customers may have different settings or contexts.

Figure 4:
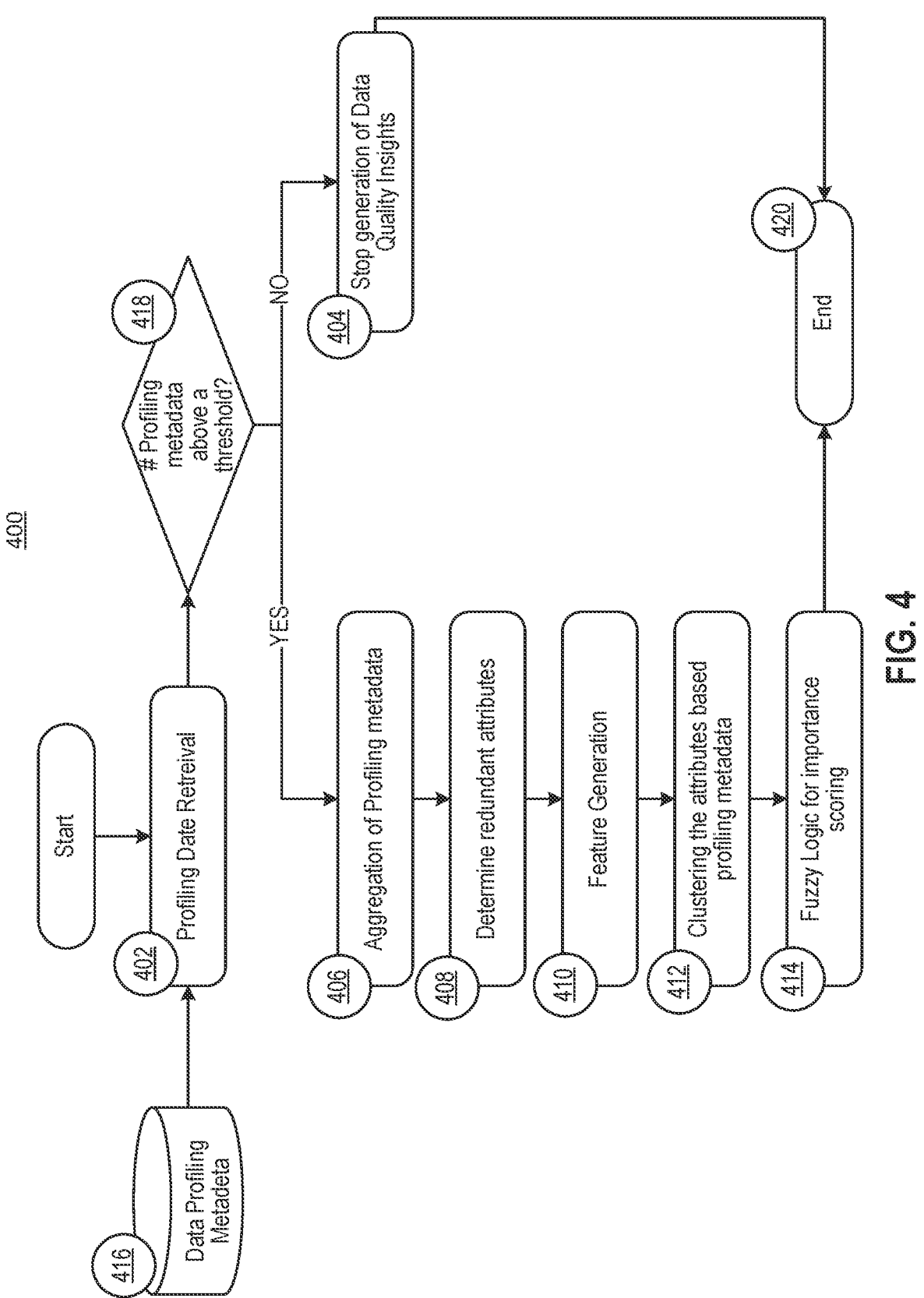
FIG. 4 is an example flow diagram for an attribute importance recommendation, in accordance with one or more implementations.

FIG. 4 is an example flow diagram of a method for recommending important attributes or indicating the importance of an attribute, in accordance with one or more implementations. The method 400 can be performed by one or more system or component depicted in FIG. 1A, 1B, or 2, including, for example, a data processing system. The data profiling process may derive a set of metrics for each of the attributes by considering a set of dimensions (key attributes for this particular data source). In the case of specific data sources, the dimensions can be a set of attributes, such as the event type, the product type, the product version or the tenant ID. In the context of the attribute importance recommendation, the profiling metrics at the level of the event type can be used. FIG. 4 demonstrates a flowchart of the disclosed method to obtain importance sorting for attributes of a data source containing several different types of events.

At ACT 402, the method 400 can include the data processing system selecting or retrieving a target data source and some of its main profiling metrics per attribute. The target data source can be data profiling metadata 416. The profile metrics can be a total number of rows, a number of unique values (per attribute), a number of distinct values (per attribute), a number of missing values (per attribute), a histograms (per attribute), a correlations table (Spearman's ρ, Pearson's r, Kendall's τ, or any other variation). It is also worth mentioning that the profiling metrics, used in the context of this process, can be adequately representative in terms of time and variability. If the number of profiling metadata goes below a pre-defined threshold, the process may terminate to safeguard the system from insufficient amount of information for inferring attribute importance.

At ACT 418, the data processing system can determine whether a number of profiling metadata is above a threshold standard. The data processing system can determine a completeness of the number of profiling metadata. If the completeness of the number of profiling metadata is lower than the threshold standard, the data processing system can move to ACT 404. If the completeness of the number of profiling metadata is above or equal to the threshold standard, the data processing system can move to ACT 406.

At ACT 404, in some embodiments, the data processing system may switch off a generation of data quality insights when the number of profiling metadata is below the threshold standard. The data processing system can stop calculating of data quality score when the completeness of the number of profiling metadata is below a threshold. The data processing system can stop evaluating of attribute importance when the completeness of the number of profiling metadata is below a threshold. The data processing system may end the method for recommending the importance of an attribute 420. In other embodiments, the data processing system may continue the whole data quality pipeline with an accepted low confidence level for deriving information.

At ACT 406, the data processing system may aggregate of profiling metadata when the number of profiling metadata is above the threshold standard. In positive case of having representative profiling metrics, the method may continue with the aggregation of such metrics for each attribute per the key dimension, named event type, and across an examined time period. The newly aggregated metrics may include at least one of: an overall total number of rows (hereafter TotalRowNum), an average number of unique values (per attribute—hereafter AvgUniqueValuesNum), a total number of unique values (per attribute—hereafter TotalUniqueValuesNum), an average number of distinct values (per attribute—hereafter AvgDistinctValuesNum), an average Number of distinct values (per attribute—hereafter TotalDistinctValuesNum), an average Number of missing values (per attribute—hereafter AvgDistinctValuesNum), a total number of missing values (per attribute—hereafter TotalMissingValuesNum), aggregated histograms (per attribute), or an aggregated correlations table.

At ACT 408, the data processing system can determine redundant attributes. The data processing system can identify attributes that can be considered redundant or duplicate. The redundant attributes can be a set of attributes that is less important or having an identical set of attribute in the profiling metadata. The data processing system can determine the redundant attributes based on coefficients of aggregated correlation table. The coefficients of aggregated correlation table can be a preliminary filtering mechanism to get the pairs of attributes that may be identical (filtering based on correlation coefficient—i.e., equal to 1 or −1). For each of these pairs of attributes, the respective distributions can be checked in terms of significant difference. Statistical tests (e.g., Kolmogorov-Smirnov Test or Chi-Squared Test) may have a great fit to this kind of attribute comparison. The selection of the statistical test may depend on the data type of the two attributes. The p-value, outcome of this type of test, can be considered as the confidence level for labelling the two attributes as redundant. In another embodiment, the cosine similarity method can be used to infer whether two attributes are redundant or not. In case of categorical variables (attributes), it can apply a pre-process step to convert the categorical values to numerical ones. This step can include categorical encoding techniques. A cosine similarity of 1 type may constitute a strong indication of two identical attributes. Overall, this step can derive a table having at least one of following columns: Attribute Name, Redundant Attribute Name, or Similarity Score (p-value or cosine similarity or any other indicator depending on the embodiment).

At ACT 410, apart from the various aggregated profiling metrics and the outcomes of ACT 406, the data processing system may generate a new kind of feature. The new kind of feature can be derived (named AttributeEventUniqueness) and accompany each attribute of the examined data source. This feature can represent how rare (or unique) an attribute is, across the total set of events of the data source. This new feature can be define through the following formula:

$$AttributeEventUniqueness = 1 - \frac{\text{\# events with non-zero profiling metrics}}{\text{\# total events for the data source}}$$

At ACT 412, the data processing system may initiate the method to infer attribute importance for each event type of the data source. As expected, among the number of attributes for a particular event, it can be common (and reasonable) to identify different patterns in terms of attribute uniqueness and profiling metrics. Essentially, this step may form the next step to unveil clusters of attributes at multiple levels of granularity. This next step may include executing a Partitioning Clustering method (K-Means Clustering method) on the dataset of attributes. For this particular step, the "sibling" attribute of each pair of redundant attributes can be excluded in order to keep the minimum viable set of attributes. The feature space for specifying clusters of attributes importance can include various variables or features from the previous steps of this process such as: TotalRowNum, TotalMissingValuesNum, AttributeCompleteness ($\cong 1-$TotalMissingValuesNum/TotalRowNum), or AttributeEventPresence) $\cong 1-$AttributeEventUniqueness). The above list of features can be exemplary and can be optionally extended to a larger set of features. In such case, the selection of clustering features can be a parameter and the final set of features to be used for the final clustering can be decided by the subsystem, as driven by the feature set that optimizes the clustering termination criterion. In order to obtain the best clustering of attribute importance by its very native profiling characteristics, it may be specify the number of clusters that has to be generated, namely the optimal number of clusters, K. This number can be somehow subjective and may depend on the method used for measuring similarities and the parameters used for partitioning. In the context of this disclosure, some more direct methods can be used. It may include optimizing a criterion, such as the within cluster sums of squares or the average silhouette. The corresponding methods can be named elbow and silhouette methods, respectively. This process of achieving the optimal number of clusters can be seen as a tuning step in the whole proposed method/process. The final outcome of step 6 is a set of K well-separated clusters/groups of data source attributes. In order to determine the degree of separation between these clusters and in general to evaluate the quality, the next step can be to apply some extra methods like Silhouette analysis, Inertia, or Dunn Index.

At ACT 414, the data processing system can iterate over the derived clusters in order to infer the sorted list of attributes in terms of their importance by calculating the aggregated characteristics of such clusters. In the context of this embodiment, the key criteria to determine the attributes importance can be clusters having high AttributeCompleteness and high AttributeEventPresence and clusters having high AttributeCompleteness, low AttributeEventPresence, and then others follow. Within this example, a fuzzy logic model can be responsible for assigning an importance score to each attribute and thus a sorted list of important attributes can be derived. After ACT 414, the data processing system may end the method for recommending the importance of an attribute 420.

Figure 5:
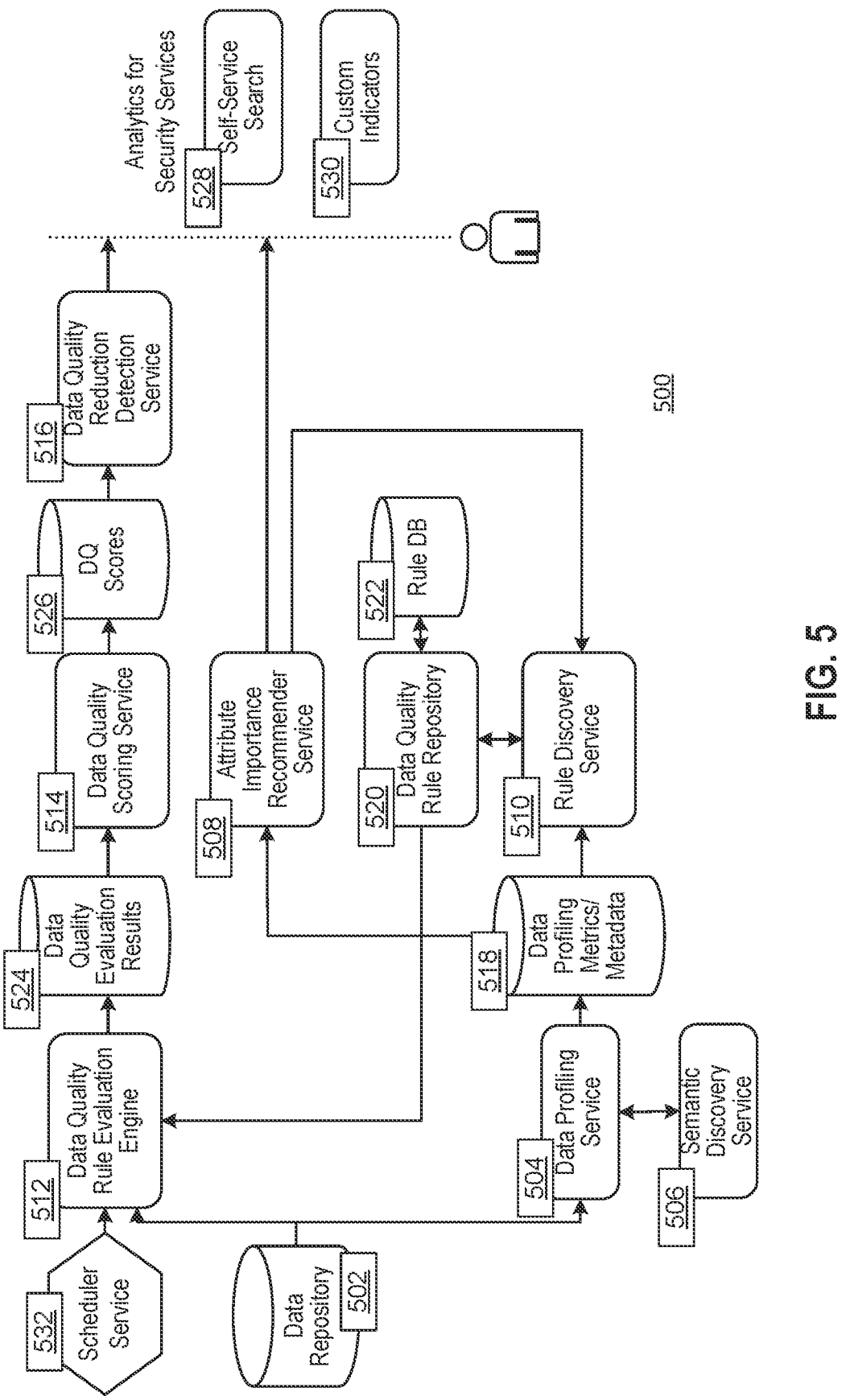
FIG. 5 is an example block diagram for analytics for security (AS/S), in accordance with one or more implementations.

FIG. 5 is an example block diagram of a method 500 for evaluating the quality of data for security risk detection, in accordance with one or more implementations. The method 500 can be performed by one or more system or component depicted in FIG. 1A, 1B, or 2, including, for example, a data processing system. At ACT 532, the data processing system can initiate a scheduler service based on a certain condition or event. The certain condition or event can be a request from a user. The data processing system can initiate the scheduler service based a periodic time interval. For example, the data processing system can start the scheduler service daily or weekly.

At ACT 502, the data processing system may store an incoming data in a data repository. The data can be semi-structured with field semantics not directly depicted in a data schema. The data repository can be accessed, modified, or interacted with by the data processing system. The data repository can include other storages to store additional data from a network of the data processing system or data from other devices of the data processing system, for example.

At ACT 504, the data processing system can process data and generate metrics and metadata 518 for the new data source via a data profiling service or pipeline. The data processing system can determine sliced by key dimensions, such as an "event type." The metadata may comprise a data type, a length, discrete values, an uniqueness, an occurrence of null values, typical string patterns, or an abstract type recognition. The metadata may refer to individual dataset attributes as well as set of attributes (e.g., key statistics, or histograms). The data processing system can generate a field metric and metadata of the new data at ACT 518.

At ACT 506, the data processing system can perform or apply a semantic discovery service on the new data. The semantic discovery service can pass data samples, calculate metadata, and respond with the identified semantic (e.g., date, user identifier, tenant identifier, event type, product/client version, etc.). The service can be trained to identify advanced specific semantics inside the semi-structured data. The information of the advanced specific semantics can be captured in the dataset metadata and persisted at storage.

At ACT 508, the data processing system can provide a list of important attributes according to the metrics of the data profiling 518 and the output of the semantic discovery 506. The data processing system can provide a recommendation that can be forwarded to a rule discovery service 510, which limits a list of rules to the most important attributes. The rules can be consumed by the product features, such as attribute importance insights.

At ACT 510, the data processing system can limit the list of rules to the most important attributes according to a data quality discovery service. The data quality rule discovery service may consume the data profiling metadata 518 and leverage the field semantics which queries a data quality rule repository 520 for sets of rules that match provided information and apply to the specific fields. Rules across data quality dimensions, such as a completeness, a uniqueness, or a validity, can be discovered.

Figure 6:
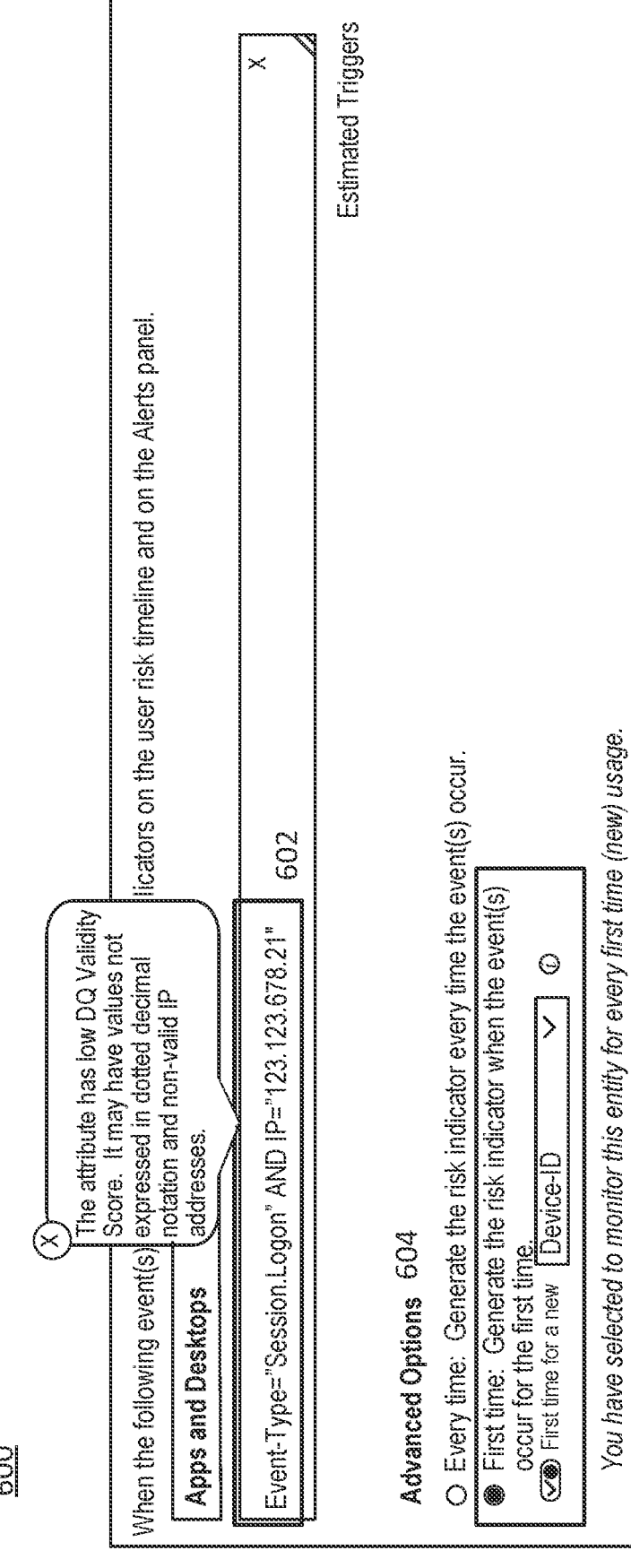
FIG. 6 is an example illustration of a creation and a modification of a data quality (DQ) insight, in accordance with one or more implementations.
Figure 7:
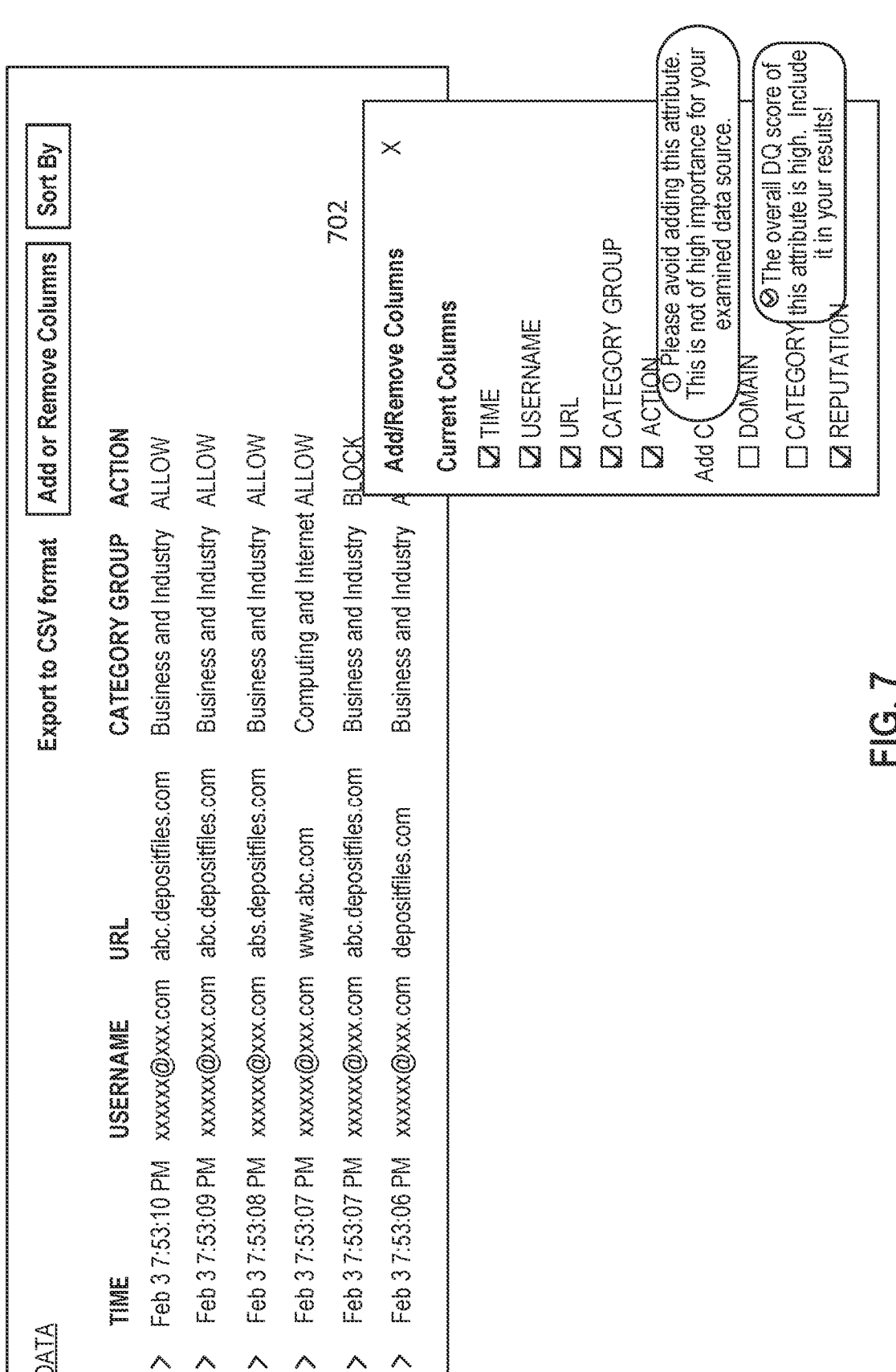
FIG. 7 is an example illustration of a data quality (DQ) insight, in accordance with one or more implementations.

At ACT 522, the data processing system can store the discovered rules in a rule database. The data processing system can access, modify, or interact with the rule database. A user can review them through the repository user interface (UI) and make any adjustments or additions, as shown in FIGS. 6 and 7. The discovered rules can be stored back in the rule database with an updated attribute configuration. In some embodiments, the rule database can be semi-manual.

At ACT 512, the data processing system can load raw data and the discovered rules. The data processing system can evaluate the raw data via a data quality rule evaluation engine. The data quality rule evaluation engine 512 can be a scalable pipeline that loads raw data and the discovered rules at the same time. The evaluation may run on-demand (e.g., initial dataset quality assessment) or periodically (e.g., daily). The evaluation results 524 can be persisted in storage. At ACT 524, the data processing system can generate a data quality evaluation result. The rule evaluation results 524 can be aggregated to more compact and easy to consume and monitor data quality scores, per attribute and overall values.

At ACT 514, the data processing system can calculate a data quality score 526 via a data quality scoring service. The data profiling metadata 518 and the calculated data quality scores 526 can be leveraged by the attribute recommendation service 508, which identifies the most important ones, worth introducing in the analytics for security features like self-service search and custom indicators.

At ACT 516, the data processing system can monitor the calculated data quality score via a data quality reduction detection service. If the data quality score drops below a threshold, the data processing system can send a notification to a customer. The data processing system can provide an analytic for security service (AS/S). The service may introduce selected attributed in AS/S self-service search 528 based on the attribute importance at ACT 508. The service can introduce selected attributes in AS/S custom indicators 530 based on the attribute importance at ACT 508.

The specific solution involves an integration of an analytics service (e.g., a AS/S) with a data quality system, making data quality "aware". In that context, this solution can extend to apply on any analytics solution included in an entity product. The data source attribute recommendation and quality monitoring mainly match use cases where a data model is exposed to the customer. Apart from the integration with the AS/S self-service search and custom indicators features, the AS/S can be leveraged at other self-service search offerings (e.g., analytics for performance (AS/P), secure private access (SPA)), or Built-in Risk Indicators. The disclosed system and methods can also be applied on any customer facing data application programming interface (e.g., security information and event management (STEM), or data service). In such cases of 3rd party consumption, data quality insights directly attached to raw data may alleviate the impact of the relaxed requirement of highly curated data.

Thus, this technical solution provides systems and methods that can surface or provide data quality insights directly in a context of investigative searches and detection rule creations of a security analytics solution, based on prior data profiling and data quality analysis of the datasets involved. The technology can include: (i) adapting the approach to a multi (offering/customer) tenant, multi data source, non-uniform event type/schema setting and (ii) not only targeting data stewards, but finding ways to surface those insights directly as value to an end customers of the security analytics solution. The data profiling, data quality rules and data quality scoring enablers described are gradually being implemented as part of AS platform.

FIG. 6 is an example illustration of a creation and a modification of a data quality (DQ) insight 600, in accordance with one or more implementations. The data quality insight 600 may indicate an attribute with a low data quality validity score. For example, the attribute can be an event type (e.g., Session.Logon) or an IP address 602. The IP address may have a low data validity because it may have values with non-valid IP addresses. The data quality insight 600 may provide advanced options 604 corresponding to the attribute with the low data quality validity score. The advanced options 604 may include "generate a risk indicator every time the event" or "generate a risk indicator when the event occurs for the first time."

FIG. 7 is an example illustration of a data quality (DQ) insight 700, in accordance with one or more implementations. The data processing system can generate an alert notification 702 after a list of important attributes is provided by the attribute importance recommender service. A user may review the list of important attributes and make a final decision in order to avoid adding an attribute if it is not important based on the evaluation result of a data source. The attribute can be time, username, URL, category group, action, domain, category, or reputation. For example, the attribute importance recommender service may indicate that important attributes include time, username, URL, category group, and action. After the user reviewed the above list, the user may remove action from the list since it is not a high important attribute in the examined data source. The user may also add an attribute to the list because a data quality score of the attribute is high.

Figure 8:
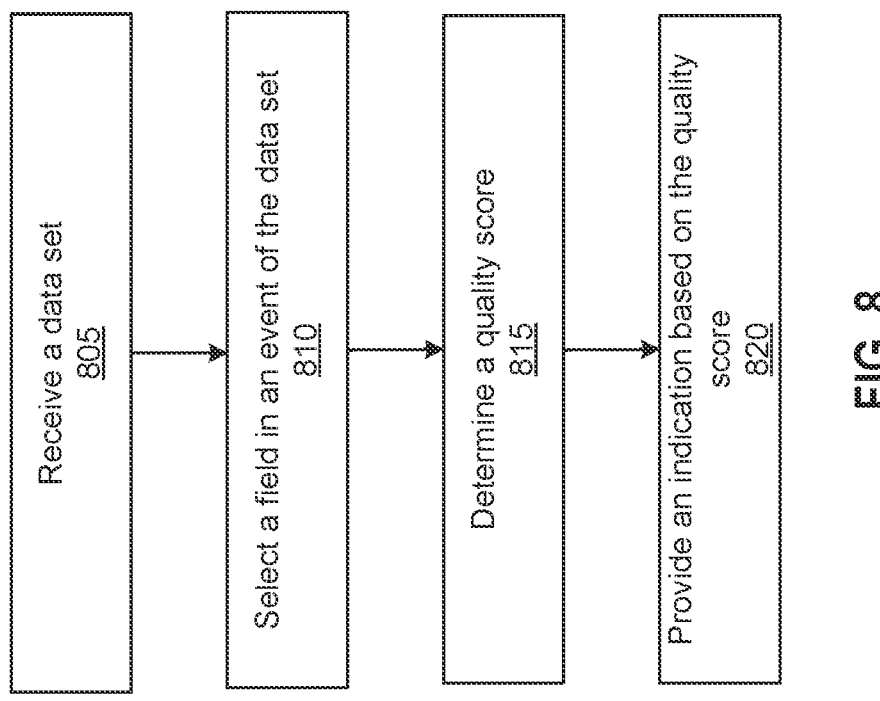
FIG. 8 is an example flow diagram of a method for introducing data quality awareness in security analytics solutions, in accordance with one or more implementations.

FIG. 8 is an example flow diagram of a method for introducing data quality awareness in security analytics solutions, in accordance with one or more implementations. The functionalities of the method may be implemented using, or performed by, any one or more of the components detailed herein in connection with FIGS. 1-7. In brief overview, a data processing system 230 may receive a data set (805). The data processing system 230 may select a field in an event of the data set (810). The data processing system 230 may determine a data quality score (815). The data processing system 230 may provide an indication based on the data quality score (810). In some embodiments, one or more operations of the process 800 is performed by the data processing system 230. In some embodiments, one or more operations of the process 800 is performed by one or more other entities. In some embodiments, the process 800 includes more, fewer, or different steps than shown in FIG. 8.

Still referring to FIG. 8 in further detail, at operation 805, one or more processors coupled to memory (e.g., data processing system 230, server 260, application performance monitor 270 or computing device 220) can receive a data set comprising one or more events generated for interactions between a plurality of computing devices that execute applications over a network. The one or more processors may begin an onboarding process for the data set responsive to receiving the data set, or responsive to an indication or instruction to begin the onboarding process. The data set may be new because the data set can be different from the data set or types of data sets with which the data processing system was previously working. The one or more processor can receive an indication that the data set is a new data set, or determine the data set is new based on an identifier of the data set or an identifier of the source of the data set.

At operation 810, the one or more processors can select, based on a model trained via machine learning with a historical data set of events generated for interactions between computing devices, a field in the one or more events of the data set that impacts an action performed with the data set. The machine learning model may determine some important fields in the data set for a newly on boarded or an existing data source. The machine learning model may generate a ranking of the level of impact of each field of the one or more fields. The one or more processors may select the field as having a highest level of impact of the one or more fields based on the ranking of the level of impact of each field of the one or more fields.

At operation 815, the one or more processors can determine a data quality score based on values of the field in the one or more events of the data set. The one or more processors may determine the data quality score based on data profiling metadata and semantic discovery. The one or more processors may determine a level of impact of the field based at least in part on the meta data and the profile metrics.

At operation 820, the one or more processors can provide, based on a comparison of the data quality score with a threshold, an indication of performance of the action with the data set. The one or more processors may determine that the data quality score does not satisfy the threshold based on the comparison. For example, the threshold score for the event of program loading may be 70. The one or more processor may determine that the event with the score of 40 does not satisfy the threshold of 70.

The following examples pertain to further embodiments, from which numerous permutations and configurations will be apparent.

An aspect of this disclosure can be directed to a system. The system can include one or more processors, coupled to memory. The one or more processors can receive a data set comprising one or more events generated for interactions between a plurality of computing devices that execute applications over a network. The one or more processors can select a field in the one or more events of the data set that impacts an action performed with the data set based on a model trained via machine learning with a historical data set of events generated for interactions between computing devices. The one or more processors can determine a data quality score based on values of the field in the one or more events of the data set. The one or more processors can provide an indication of performance of the action with the data set based on a comparison of the data quality score with a threshold.

In certain embodiments, the action may comprise detection of a security risk for one or more of the plurality of computing devices or applications. The one or more processors can be configured to determine that the data quality score does not satisfy the threshold based on the comparison. The one or more processors can be configured to provide an alert that may indicate that the data processing system is unable to evaluate the security risk with performance above a satisfactory level. The action may comprise a search function configured to execute a query on the data set. The one or more processors can be configured to determine that the data quality score does not satisfy the threshold based on the comparison. The one or more processors can be configured to provide an alert that may indicate that the data processing system is unable to generate search results via the search function with performance above a satisfactory level.

In some embodiments, the one or more events may comprise a plurality of fields. The plurality of fields may comprise at least one of a tenant identifier, client version, product version, type of event, or computing session identifier. The one or more processors can be configured to identify, via the model trained via machine learning, a plurality of fields in the data set. The one or more processors can be configured to select a rule from a rule repository configured to determine the performance of the action with the data set via the data quality score based on the plurality of fields in the data set. The one or more processors can be configured to select the field from the plurality of fields based on the rule configured to use the field to determine the performance of the action.

In some embodiments, the one or more processors can be configured to select the field from a plurality of fields in response to detection of a rule that uses the field to perform the action. The one or more processors can be configured to establish the threshold corresponding to satisfactory performance of the action based on the historical data set. The one or more processors can be configured to receive an indication to onboard a data source that provides the data set. The one or more processors can be configured to detect, via application of a semantic discovery technique to a training data set provided by the data source, a plurality of fields of the training data set. The one or more processors can be configured to generate meta data for the plurality of fields detected via the semantic discovery technique. The one or more processors can be configured to generate profile metrics based on the meta data. The one or more processors can be configured to determine, based at least in part on the meta data and the profile metrics, a level of impact each field of the plurality of fields has on the performance of the action. The one or more processors can be configured to select, based on a ranking of the level of impact of each field of the plurality of fields, the field as having a highest level of impact of the plurality of fields. The one or more processors can be configured to select, from a rule repository, a rule to perform the action corresponding to the field based on the field having the highest level of impact of the plurality of fields. The profile metrics may comprise at least one of a number of rows in the training data set, a number of unique values per field of the plurality of fields, a number of distinct values per field of the plurality of fields, a number of missing values per field of the plurality of fields, or a histogram for each field of the plurality of fields.

In one aspect, the present disclosure is directed to a method for introducing data quality awareness in security analytics solutions. The method can include receiving, by a data processing system comprising one or more processors coupled with memory, a data set comprising a one or more events generated for interactions between a plurality of computing devices that execute applications over a network. The data processing system may select, based on a model trained via machine learning with a historical data set of events generated for interactions between computing devices, a field in the one or more events of the data set that impacts an action performed with the data set. The data processing system may determining that a data quality score based on values of the field in the one or more events of the data set. The data processing system may provide, based on a comparison of the data quality score with a threshold, an indication of performance of the action with the data set.

In some embodiments, the action may comprise detection of a security risk for one or more of the plurality of computing devices or applications. The data processing system may determine that the data quality score does not satisfy the threshold based on the comparison. The data processing system may provide an alert that indicates that the data processing system is unable to evaluate the security risk with performance above a satisfactory level.

In some embodiments, the action may comprise a search function configured to execute a query on the data set. The data processing system may determining, based on the comparison, that the data quality score does not satisfy the threshold. The data processing system may provide an alert that indicates that the data processing system is unable to generate search results via the search function with performance above a satisfactory level. The one or more events may comprise a plurality of fields, the plurality of fields comprising at least one of a tenant identifier, client version, product version, type of event, or computing session identifier.

In some embodiments, the data processing system may identify, via the model trained via machine learning, a plurality of fields in the data set. The data processing system may select, based on the plurality of fields in the data set, a rule from a rule repository configured to determine the performance of the action with the data set via the data quality score. The data processing system may select the field from the plurality of fields based on the rule configured to use the field to determine the performance of the action. The data processing system may select the field from a plurality of fields in response to detection of a rule that uses the field to perform the action. The data processing system may establish, based on the historical data set, the threshold corresponding to satisfactory performance of the action.

In some embodiments, the data processing system may receive an indication to onboard a data source that provides the data set. The data processing system may detect, via application of a semantic discovery technique to a training data set provided by the data source, a plurality of fields of the training data set. The data processing system may generate meta data for the plurality of fields detected via the semantic discovery technique. The data processing system may generate profile metrics based on the meta data. The data processing system may determine, based at least in part on the meta data and the profile metrics, a level of impact each field of the plurality of fields has on the performance of the action. The data processing system may select, based on a ranking of the level of impact of each field of the plurality of fields, the field as having a highest level of impact of the plurality of fields.

In one aspect, the present disclosure is directed to a non-transitory computer readable medium storing program instructions. The non-transitory computer-readable medium can store instructions that, when executed by one or more processors, cause the one or more processors to receive a data set comprising a one or more events generated for interactions between a plurality of computing devices that execute applications over a network. The instructions can include instructions to select, based on a model trained via machine learning with a historical data set of events generated for interactions between computing devices, a field in the one or more events of the data set that impacts an action performed with the data set. The instructions can include instructions to determine a data quality score based on values of the field in the one or more events of the data set. The instructions can include instructions to provide, based on a comparison of the data quality score with a threshold, an indication of performance of the action with the data set. The action may comprise at least one of detection of a security risk for one or more of the plurality of computing devices or applications or a search function configured to execute a query on the data set.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system, comprising:
a data processing system comprising one or more processors, coupled with memory, to:
receive a data set comprising one or more events generated for interactions between a plurality of computing devices that execute applications over a network;
select, based on a model trained via machine learning with a historical data set of events generated for interactions between computing devices, a field in the one or more events of the data set that impacts an action performed with the data set;
determine a data quality score based on values of the field in the one or more events of the data set; and
provide, based on a comparison of the data quality score with a threshold, an indication of performance of the action with the data set;
wherein the action comprises detection of a security risk for one or more of the plurality of computing devices or applications; and
wherein the data processing system is further configured to:
determine, based on the comparison, the data quality score does not satisfy the threshold; and
provide an alert that indicates that the data processing system is unable to evaluate the security risk with performance above a satisfactory level.

2. The system of claim 1, wherein the action comprises a search function configured to execute a query on the data set.

3. The system of claim 2, wherein the data processing system is further configured to:
determine, based on the comparison, the data quality score does not satisfy the threshold; and
provide an alert that indicates that the data processing system is unable to generate search results via the search function with performance above a satisfactory level.

4. The system of claim 1, wherein the one or more events comprise a plurality of fields, the plurality of fields comprising at least one of a tenant identifier, client version, product version, type of event, or computing session identifier.

5. The system of claim 1, wherein the data processing system is further configured to:
identify, via the model trained via machine learning, a plurality of fields in the data set;
select, based on the plurality of fields in the data set, a rule from a rule repository configured to determine the performance of the action with the data set via the data quality score; and
select the field from the plurality of fields based on the rule configured to use the field to determine the performance of the action.

6. The system of claim 1, wherein the data processing system is further configured to:
select the field from a plurality of fields in response to detection of a rule that uses the field to perform the action; and
establish, based on the historical data set, the threshold corresponding to satisfactory performance of the action.

7. The system of claim 1, wherein the data processing system is further configured to:
receive an indication to onboard a data source that provides the data set;

detect, via application of a semantic discovery technique to a training data set provided by the data source, a plurality of fields of the training data set;

generate meta data for the plurality of fields detected via the semantic discovery technique;

generate profile metrics based on the meta data;

determine, based at least in part on the meta data and the profile metrics, a level of impact each field of the plurality of fields has on the performance of the action; and select, based on a ranking of the level of impact of each field of the plurality of fields, the field as having a highest level of impact of the plurality of fields.

8. The system of claim 7, wherein the data processing system is further configured to:

select, from a rule repository, a rule to determine the performance of the action corresponding to the field based on the field having the highest level of impact of the plurality of fields.

9. The system of claim 7, wherein the profile metrics comprising at least one of a number of rows in the training data set, a number of unique values per field of the plurality of fields, a number of distinct values per field of the plurality of fields, a number of missing values per field of the plurality of fields, or a histogram for each field of the plurality of fields.

10. A method, comprising:

receiving, by a data processing system comprising one or more processors coupled with memory, a data set comprising a one or more events generated for interactions between a plurality of computing devices that execute applications over a network;

selecting, by the data processing system based on a model trained via machine learning with a historical data set of events generated for interactions between computing devices, a field in the one or more events of the data set that impacts an action performed with the data set;

determining, by the data processing system, a data quality score based on values of the field in the one or more events of the data set; and providing, by the data processing system based on a comparison of the data quality score with a threshold, an indication of performance of the action with the data set;

wherein the action comprises detection of a security risk for one or more of the plurality of computing devices or applications, comprising:

determining, by the data processing system based on the comparison, the data quality score does not satisfy the threshold; and providing, by the data processing system, an alert that indicates that the data processing system is unable to evaluate the security risk with performance above a satisfactory level.

11. The method of claim 10, wherein the action comprises a search function configured to execute a query on the data set, comprising:

determining, by the data processing system based on the comparison, the data quality score does not satisfy the threshold; and providing, by the data processing system, an alert that indicates that the data processing system is unable to generate search results via the search function with performance above a satisfactory level.

12. The method of claim 10, wherein the one or more events comprise a plurality of fields, the plurality of fields comprising at least one of a tenant identifier, client version, product version, type of event, or computing session identifier.

13. The method of claim 10, comprising:

identifying, by the data processing system via the model trained via machine learning, a plurality of fields in the data set;

selecting, by the data processing system based on the plurality of fields in the data set, a rule from a rule repository configured to determine the performance of the action with the data set via the data quality score; and selecting, by the data processing system, the field from the plurality of fields based on the rule configured to use the field to determine the performance of the action.

14. The method of claim 10, comprising:

selecting, by the data processing system, the field from a plurality of fields in response to detection of a rule that uses the field to perform the action; and establishing, by the data processing system based on the historical data set, the threshold corresponding to satisfactory performance of the action.

15. The method of claim 10, comprising:

receiving, by the data processing system, an indication to onboard a data source that provides the data set;

detecting, by the data processing system via application of a semantic discovery technique to a training data set provided by the data source, a plurality of fields of the training data set;

generating, by the data processing system, meta data for the plurality of fields detected via the semantic discovery technique;

generating, by the data processing system, profile metrics based on the meta data;

determining, by the data processing system based at least in part on the meta data and the profile metrics, a level of impact each field of the plurality of fields has on the performance of the action; and selecting, by the data processing system based on a ranking of the level of impact of each field of the plurality of fields, the field as having a highest level of impact of the plurality of fields.

16. A non-transitory computer-readable medium storing processor-executable instructions that, when executed by one or more processors, cause the one or more processors to:

receive a data set comprising a one or more events generated for interactions between a plurality of computing devices that execute applications over a network;

select, based on a model trained via machine learning with a historical data set of events generated for interactions between computing devices, a field in the one or more events of the data set that impacts an action performed with the data set;

determine a data quality score based on values of the field in the one or more events of the data set; and provide, based on a comparison of the data quality score with a threshold, an indication of performance of the action with the data set;

wherein the action comprises detection of a security risk for one or more of the plurality of computing devices or applications, comprising:

determining, by the data processing system based on the comparison, the data quality score does not satisfy the threshold; and providing, by the data processing system, an alert that indicates that the data processing system is unable to evaluate the security risk with performance above a satisfactory level.

17. The non-transitory computer-readable medium of claim 16, wherein the action comprises at least one of detection of a security risk for one or more of the plurality of computing devices or applications or a search function configured to execute a query on the data set.

\*    \*    \*    \*    \*